(12) United States Patent
Liao et al.

(10) Patent No.: US 6,697,549 B2
(45) Date of Patent: Feb. 24, 2004

(54) OPTICAL SWITCH

(75) Inventors: Shang Chin Liao, Tu-Chen (TW); Kun-Tsan Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 241 days.

(21) Appl. No.: 10/002,892

(22) Filed: Dec. 5, 2001

(65) Prior Publication Data

US 2004/0008924 A1 Jan. 15, 2004

(30) Foreign Application Priority Data

Sep. 12, 2001 (TW) ...................................... 90215723 U

(51) Int. Cl.[7] .............................. G02B 6/35; G02B 6/32
(52) U.S. Cl. .............................. 385/18; 385/34; 385/25; 385/147
(58) Field of Search .............................. 385/18, 33, 25, 385/34, 31, 35, 147

(56) References Cited

U.S. PATENT DOCUMENTS

| | | | | |
|---|---|---|---|---|
| 5,742,712 A | * | 4/1998 | Pan et al. ...................... | 385/18 |
| 5,838,847 A | * | 11/1998 | Pan et al. ...................... | 385/18 |
| 6,160,929 A | * | 12/2000 | Takahashi ...................... | 385/21 |
| 6,477,289 B1 | * | 11/2002 | Li ................................. | 385/16 |
| 6,587,614 B2 | * | 7/2003 | Liao et al. ...................... | 385/18 |
| 6,606,446 B1 | * | 8/2003 | Shen et al. .................. | 385/140 |

\* cited by examiner

Primary Examiner—Akm Enayet Ullah
Assistant Examiner—Jerry T Rahll
(74) Attorney, Agent, or Firm—Wei Te Chung

(57) ABSTRACT

An optical switch (99) includes a housing (10), a driver (50), a first I/O port (20), a second I/O port (40) and a switching element (32). Each I/O port has a collimator (27,47) and attaches to input and to output fibers. The housing holds the first I/O port and the second I/O port in alignment with one another and supports the driver on a substrate (11) of the housing. The switching element is rotationally attached to the driver and has a first and second mirrors (322, 323) and a GRIN rod lens (324). The driver drives the switching element between a first position, wherein the rod lens aligns with the I/O ports, and a second position, wherein the mirrors align with the I/O ports. Thus light signals from input fibers are variously directed to output fibers on an opposite side, or on the same side, of the optical switch.

26 Claims, 7 Drawing Sheets

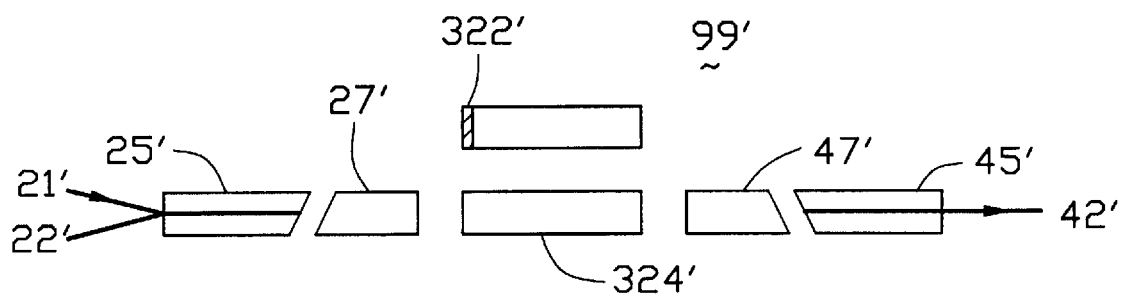
FIG. 10
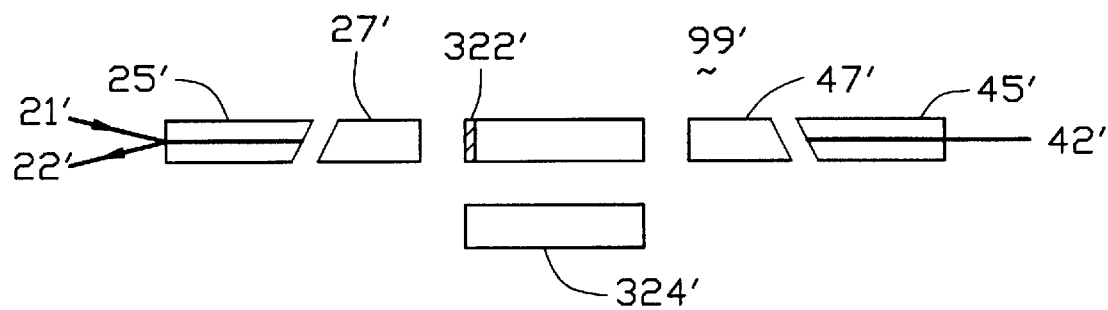
FIG. 11
FIG. 12
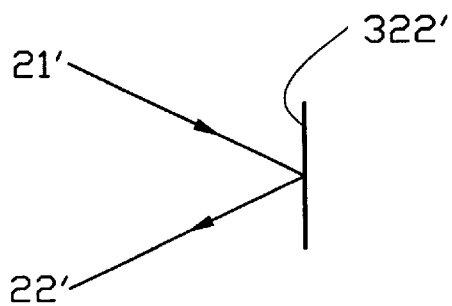
FIG. 13

OPTICAL SWITCH

BACKGROUND OF THE INVENTION

1. Field of the Invention

The present invention relates to an optical switch for use in fiber communication and optical network technology, and particularly to a mechanically operated optical switch with a GRIN (graded index) lens and at least one mirror as a switching element.

2. Description of Related Art

Optical signals are commonly transmitted in optical fibers, which provide efficient light channels through which optical signals can pass. Recently, optical fibers have been used in various fields, including telecommunications, where light passing through an optical fiber is used to convey either digital or analog information. Efficient switching of optical signals between individual fibers is necessary in most optical processing systems or networks to achieve the desired routing of the signals.

In optical fiber systems, various methods have been previously developed for switching optical signals between fiber cables. Among these previously developed methods, one important category is mechanical optical switches.

Mechanically operated optical switches come in two different designs: in one design, the optical components move, and in the other design, the fibers move. Factors for assessing the capability of an optical switch include low insertion loss (<1 dB), good isolation performance (>50 dB) and bandwidth capacity compatible with the fiber network the switch is supporting.

Moving fiber switches involve the actual physical movement of one or more of the fibers to specific positions to accomplish the transmission of a light beam from one fiber end to another under selected switching conditions. Moving optical component switches, on the other hand, include optical collimating lenses which expand the light beam coming from the fibers, and then, using moving prisms or mirrors, redirect the expanded light beam to other fibers, as required by the switching process.

The moving fiber switches have a stringent tolerance requirement for the amount and direction of fiber movement. The tolerance is typically a small fraction of the fiber core diameter for two fibers to precisely collimate to reduce loss. The fibers themselves are quite thin and may be subject to breakage if not properly protected. On the other hand, reinforcing the fibers with stiff protective sheaths makes the fibers less flexible, increasing the force required to manipulate each fiber into alignment. Thus these moving fiber switches share a common problem of requiring high precision parts to obtain precise position control and low insertion loss. This results in high cost and complicated manufacture of the switches. Moreover, frequently moving fibers to and from is apt to damage or even break the fibers.

The moving optical component switches, in contrast, have less stringent movement control tolerance requirements. The presence of the collimating lenses allows relaxation of the tolerance requirements.

As illustrated in FIG. 14 and FIG. 15, U.S. Pat. No. 5,742,712 describes a mechanical optical switch, which relies on a mirror 420 being moveable into an optical path between a first and second fixed collimating lenses (428, 436). When the moveable mirror 420 is displaced out of the optical path (FIG. 14), the light signals from a first input fiber 422 are transmitted to a second output fiber 432 and the light signals from a second input fiber 430 are transmitted to a first output fiber 424 through the first and second collimating lenses (428, 436). However, when the moveable mirror 420 is moved into the optical path (FIG. 15), the light signals from the first input fiber 422 are reflected back through the first collimating lens 428 into the first output fiber 424, which is parallel to and in close proximity with the first input fiber 422. The light signals from the second input fiber 430 are likewise reflected back through the second collimating lens 436 into the second output fiber 432, which is parallel to and in close proximity with the second input fiber 430.

In this mechanical optical switch, the gap between the two collimating lenses (428, 436), must be sufficiently large to allow movement of the movable mirror 420 between the two collimating lenses. However, this gap has a significant effect on insertion losses across the switch. For this reason, the gap is preferably less than about 2.0 mm. In addition, in a fixed collimator system initially without a mirror, the insertion of a two-surface mirror will introduce an insertion loss in an input/output port proportional to a thickness of the two-surface mirror.

For the above reasons, an improved optical switch is desired. In particular, an optical switch is desired which has high optical efficiency and which does not require precise alignment or movement of the optical fibers themselves.

SUMMARY OF THE INVENTION

An object of the present invention is to provide an optical switch in which the optical fibers don't move.

Another object of the present invention is to provide an optical switch which allows easy alignment of associated fibers and which has a low insertion loss.

Yet another object of the present invention is to provide an optical switch which uses a GRIN lens as a switching element.

An optical switch in accordance with one embodiment of the present invention comprises a housing, a driver, a first I/O (input/output) port, a second I/O port and a switching element. The housing holds the first I/O port and the second I/O port in alignment with one another and supports the driver on the housing substrate. The switching element is rotationally attached to the driver and has a first and second mirrors and a rod lens. The driver drives the switching element between a first position, wherein the rod lens aligns with the I/O ports, and a second position, wherein the mirrors align with the I/O ports.

Other objects, advantages and novel features of the invention will become more apparent from the following detailed description when taken in conjunction with the accompanying drawings.

BRIEF DESCRIPTION OF THE DRAWINGS

FIG. 10 is an optical elements cross-sectional view of a second embodiment optical switch in a first position;

FIG. 11 is an essential optical path of the second embodiment optical switch of FIG. 10 in the first position;

FIG. 12 is an optical elements cross-sectional view of the second embodiment optical switch of FIG. 10 in a second position;

FIG. 13 is an essential optical path of the second embodiment optical switch of FIG. 10 in the second position;

DETAILED DESCRIPTION OF THE INVENTION

Figure 1:
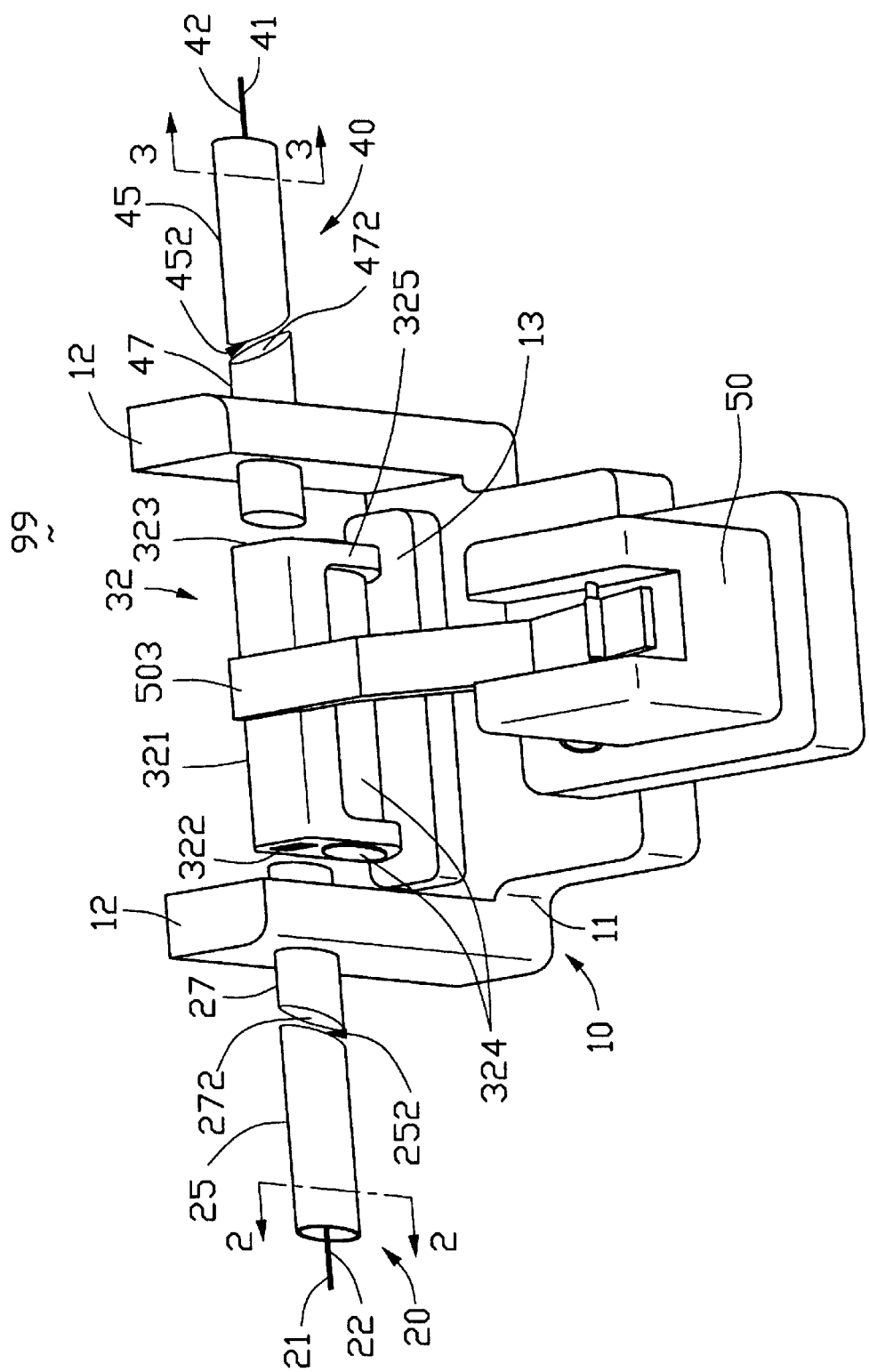
FIG. 1 is a perspective view of an optical switch according to the present invention.

Referring to FIG. 1, an optical switch 99 according to the present invention comprises a housing 10, a first I/O port 20, a second I/O port 40, a driver 50 and a switching element 32. The housing 10 comprises a substrate 11 forming a base of the housing 10, two upright beams 12 extending upward at a front of the substrate 11 and a stopper 13 extending upward from the substrate 11 between the two upright beams 12. The driver 50 is fixed to and extends upward from a rear of the substrate 11.

The switching element 32 comprises a moving arm 503 having a rear end (not labeled) adapted for connecting with the driver 50, a cross beam 321 attached to a forward end of moving arm 503, and a pair of fixing arms 325 extending downward from either end of the cross beam 321. A first and a second mirrors 322, 323 are fixed at opposite side ends of the cross beam 321, and a rod lens 324 is accommodated between and through the fixing arms 325. The rod lens 324 is a half pitch GRIN lens.

The first I/O port 20 includes a first DFP (dual fiber pigtail) 25, and a first collimator 27. The first DFP 25 has an angled front surface 252 and the first collimator has an angled back surface 272. The first DFP 25 and the first collimator 27 are held in fixed relation by using epoxy or solder between the angled front and back surfaces 252, 272. The first collimator 27 is a quarter pitch GRIN lens, or can instead be a 0.23 pitch GRIN lens.

Figure 2:
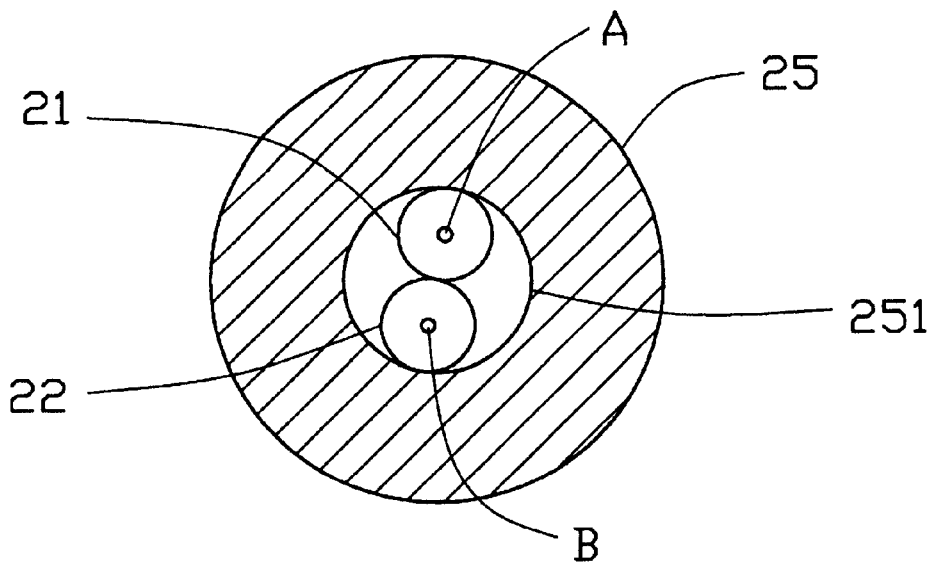
FIG. 2 is a cross-sectional view taken along the line 2—2 in FIG. 1.

Referring to FIG. 2, the first DFP 25 is an elongate tube having a hollowed out interior aperture 251 extending longitudinally therethrough. The aperture 251 accommodates a first input fiber 21 and a first output fiber 22 while constraining two centers of the first input fiber 21 and the first output fiber 22 to remain respectively on points A and B.

Figure 3:
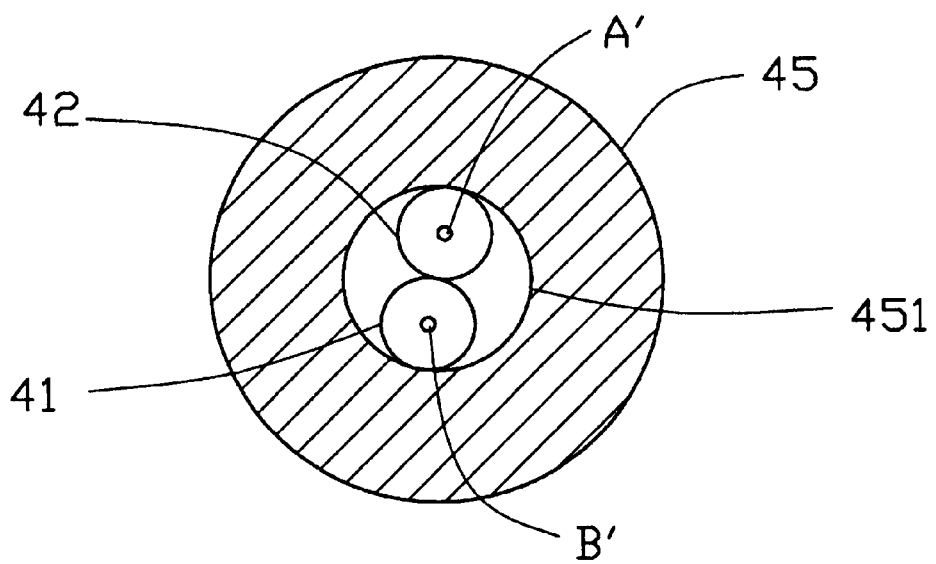
FIG. 3 is a cross-sectional view taken along the line 3—3 in FIG. 1.
Figure 4:
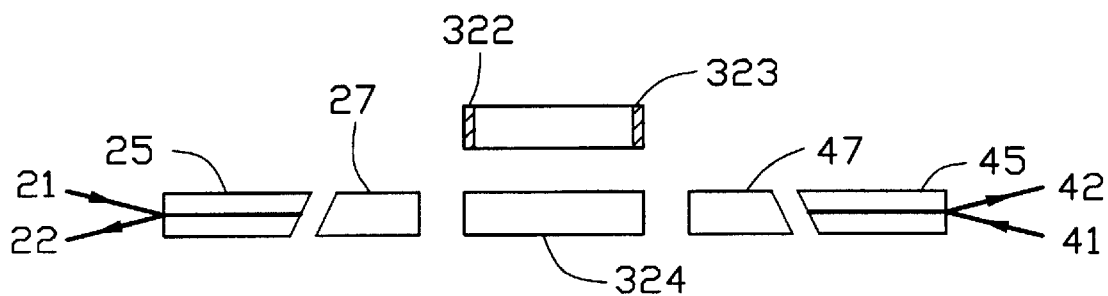
FIG. 4 is an optical elements cross-sectional view of the optical switch of FIG. 1 in a first position.
Figure 5:
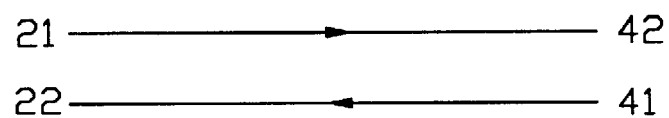
FIG. 5 is an essential optical path of the optical switch in FIG. 1 in the first position.

FIGS. 1 and 3 show that the second I/O port 40 is just like the first I/O port 20, having a second collimator 47, angled front surface 452, angled back surface 472, and a second DFP 45. An aperture 451 of the second DFP 45 accommodates a second input fiber 41 and a second output fiber 42, and constrains centers of the second input fiber 41 and the second output fiber 42 to remain respectively on points B' and A'.

In assembly, the first I/O port 20 and the second I/O port 40 are engaged with corresponding upright beams 12, which hold the first and second I/O ports 20, 40 in alignment with each other. The driver 50 is fixed to and extends upward from a rear of the substrate 11. The switching element 32 is rotationally attached to the driver 50 at a rear end of the moving arm 503.

When the driver 50 is actuated, the switching element 32 is either moved up into a first position, wherein the rod lens 324 aligns with the two I/O ports 20, 40, or down into a second position, wherein the mirrors 322, 323 align with the two I/O ports 20, 40. Downward movement of the switching element 32 is limited by the fixing arms 325 striking the stopper 13.

FIGS. 4–9 illustrate the operation of the optical switch 99. In the first position (FIGS. 4 and 5), the switching element 32 is in the upward position with the rod lens 324 aligned with the first and second collimators 27, 47. Light beams from the first and second input fibers 21, 41 transmit through the first collimator 27 and the second collimator 47, respectively. Each light beam is transmitted in opposite directions from each other through the rod lens 324, and then through the second collimator 47 and the first collimator 27, and then through the second output fiber 42 and the first output fiber 22, respectively.

Figure 6:
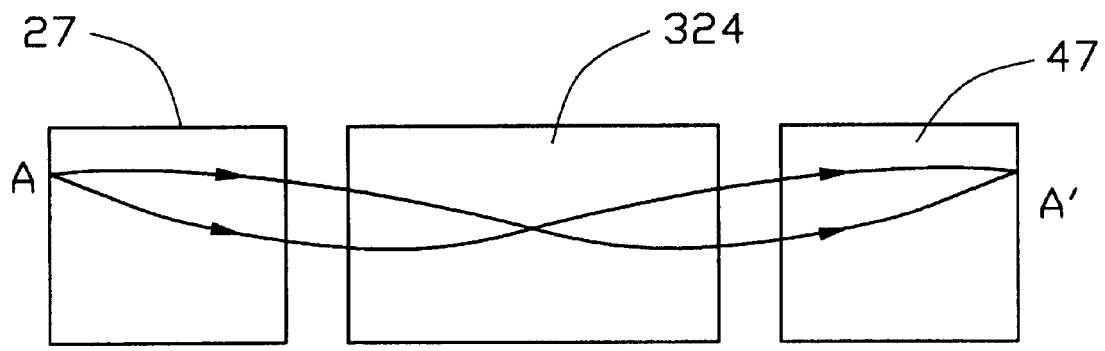
FIG. 6 is a beam trace in GRIN lenses of the optical switch in FIG. 1 in the first position.
Figure 7:
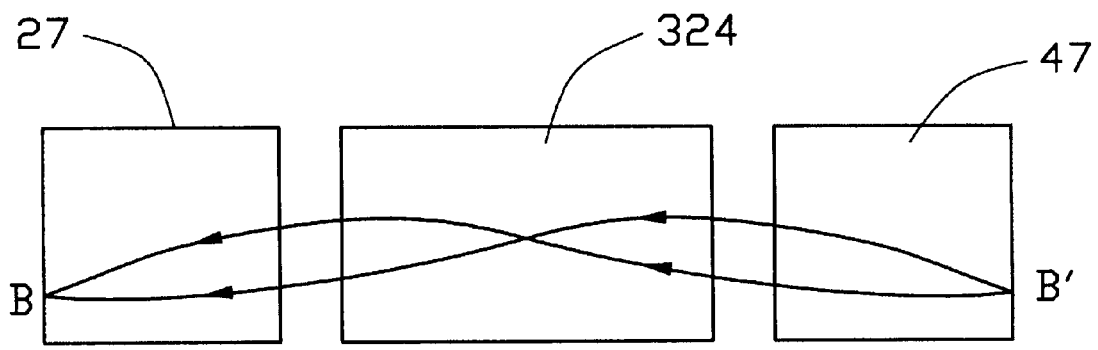
FIG. 7 is a second beam trace in the GRIN lenses of the optical switch in FIG. 1 in the first position.
Figure 8:
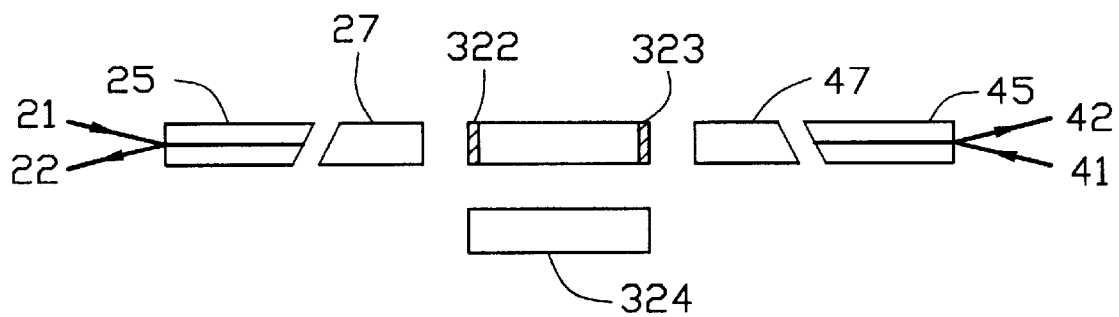
FIG. 8 is an optical elements cross-sectional view of the optical switch of FIG. 1 in a second position.
Figure 9:
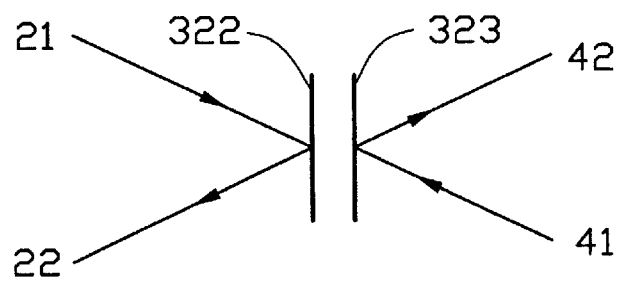
FIG. 9 is an essential optical path of the optical switch in FIG. 1 in the second position.
Figure 14:
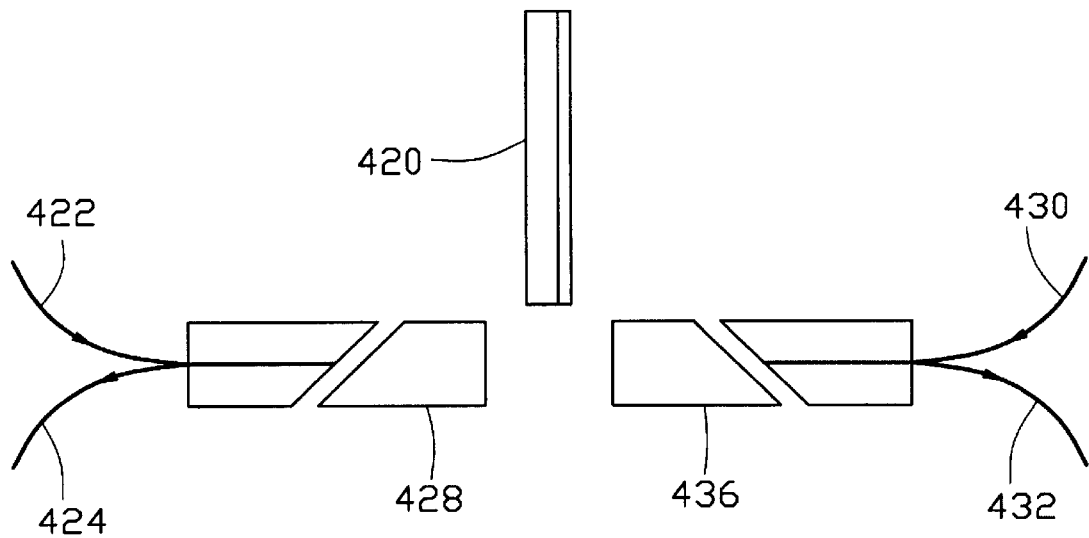
FIG. 14 is an optical elements cross-sectional view of a prior art mechanical optical switch in a first position.
Figure 15:
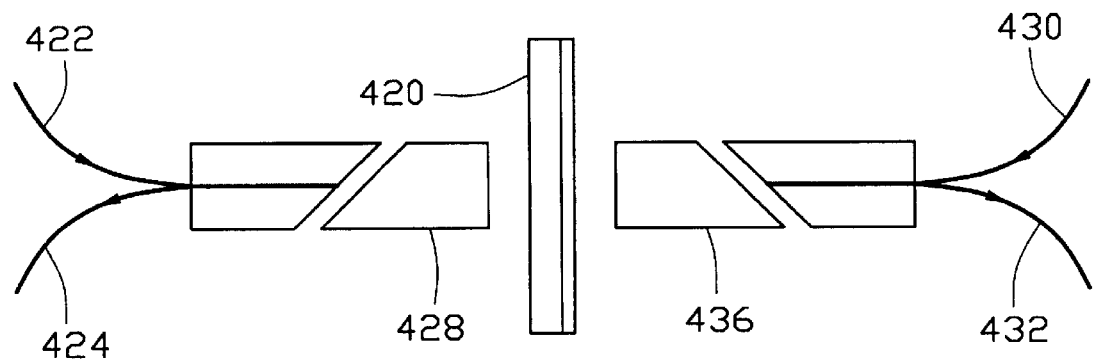
FIG. 15 is an optical elements cross-sectional view of the prior art switch of FIG. 14 in a second position.

FIGS. 6 and 7 show tracings of light beams through the switch 99 when the switch 99 is in the first position. Note that light beams input through the points A and B' are output through the points A' and B, respectively, after transmitting two quarter pitch GRIN lenses 27, 47 and a half pitch GRIN lens 324. The two quarter pitch GRIN lenses 27, 47 (the first and second collimators 27, 47) have the effect of a half pitch GRIN lens which has been split into two equal parts.

In the second position (FIGS. 8, 9), the switching element 32 is in the downward position, where the first and second mirrors 322, 323 sit in the optical path and align with the two I/O ports 20, 40. In this position, light beams from the first and second input fibers 21, 41 are transmitted through the first and second collimators 27, 47 and reflect off of the first and second mirrors 322, 323, to transmit back through the first and second collimators 27, 47 and then through the first and second output fibers 22, 42, respectively.

FIGS. 10–13 show drawings describing operation of a second embodiment of an optical switch 99' in accordance with the present invention. The optical switch 99' makes use of a first mirror 322' and a rod lens 324' to realize alternate switching optical paths. The mirror 322' and the rod lens 324' move between a first position, wherein the rod lens 324' aligns with a first and second collimators 27', 47', and a second position, wherein the first mirror 322' aligns with the first collimator 27'.

In the first position (FIGS. 10, 11), the rod lens 324' aligns with the first and second collimators 27', 47'. A light beam from a first input fiber 21' transits the first collimator 27' and is then transmitted by the rod lens 324' to the second collimator 47' to the second output fiber 42'.

In the second position (FIGS. 12, 13), the first mirror 322' aligns with the first collimator 27'. A light beam from the first input fiber 21' is reflected by the first mirror 322' to transmit through the first collimator 27' and then through the first output fiber 22'.

The optical switch 99 of the present invention uses a moving GRIN lens and mirrors as switching elements, thereby avoiding the need to move fibers. Alignment is easily realized and low insertion loss is achieved by using the switching element 32 with two mirrors 322, 323 and the rod lens 324 to replace the two reflecting-surface mirror of the prior art.

Advantages of the optical switch 99 of the present invention over those of the prior art include the following. First, only optical components of the switch move; no fibers move. Second, the first and second I/O ports are easily aligned with one another. Third, operation of the switch leaves only small gaps between moving optical components, rather than the relatively large gap left between the two opposing collimating lenses of the prior art design when the mirror is moved out of the gap between the collimating lenses. Thus, insertion loss in the design of the present invention is minimized. Basically, insertion loss is minimized by replacing an air gap left by the prior art design with the rod lens of the present design.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the diameter of the DFP 25, 45 could be altered to accommodate more than two fibers to produce a double 1×2 optical switch or a double 2×2 optical switch.

We claim:

1. An optical switch for switching light signals coming from a first and second input fibers between a first and second output fibers, comprising:
    a first collimator aligning with the first input and first output fibers and collimating input and output light;
    a second collimator aligning with the second input and second output fibers and collimating input and output light; and
    a switching element comprising a rod lens and two mirrors, the rod lens and the two mirrors being moveable between a first position, wherein the rod lens aligns with the first and second collimators, and a second position, wherein the two mirrors align with the first and second collimators;
    whereby, when the switching element is in the first position, light from the first and second input fibers transmits sequentially through the first and second collimator, the rod lens, the second and first collimators, and then to the second and first output fibers, respectively; and when the switching element is in the second position, the light from the first and second input fibers transmits through the first and second collimators, is reflected by the first and second mirrors, and retransmits through the first and second collimators to the first and second output fibers, respectively.

2. The optical switch of claim 1, wherein the first collimator comprises a first GRIN lens.

3. The optical switch as claimed in claim 2, wherein the first GRIN lens collimates light from the first input fiber and light reflected by the first mirror or transmitted by the rod lens.

4. The optical switch of claim 1, wherein the second collimator comprises a second GRIN lens.

5. The optical switch as claimed in claim 4, wherein the second GRIN lens collimates light from the second input fiber and light reflected by the second mirror or transmitted by the rod lens.

6. The optical switch of claim 1, further comprising a first DFP, retaining the first input and output fibers.

7. The optical switch of claim 6, further comprising a second DFP, retaining the second input and output fibers.

8. The optical switch of claim 1, further comprising a driver which drives the switching element to move between the first position and the second position.

9. An optical switch for switching light signals coming from a first input fiber between a first and second output fibers, comprising:
    a first collimator aligning with the first input and first output fibers and collimating input and output light;
    a second collimator aligning with the second output fiber and collimating output light; and
    a switching element comprising a rod lens and a mirror, the rod lens and the mirror being moveable between a first position, wherein the rod lens aligns with the first and second collimators, and a second position, wherein the mirror aligns with the first collimator;
    whereby, when the switching element is in the first position, light from the first input fiber transmits through the rod lens to the second output fiber, and when the switching element is in the second position, the light from the first input fiber is reflected by the mirror to transmit through the first output fiber.

10. The optical switch of claim 9, wherein the first collimator comprises a first GRIN lens.

11. The optical switch as claimed in claim 10, wherein the first GRIN lens collimates light from the first input fiber and light reflected by the mirror.

12. The optical switch of claim 9, wherein the second collimator comprises a second GRIN lens.

13. The optical switch as claimed in claim 12, wherein the second GRIN lens collimates light transmitted by the rod lens.

14. The optical switch of claim 9, further comprising a first dual fiber pigtail (DFP), retaining the first input and first output fibers.

15. The optical switch of claim 14, further comprising a second DFP, retaining the second output fiber.

16. The optical switch of claim 9, further comprising a driver which drives the switching element to move between the first position and the second position.

17. An optical switch for switching light signals coming from at least one input fibers between at least two output fibers, comprising:
    a first collimator aligning with fibers on a first side of the optical switch and collimating input and output light;
    a second collimator aligning with fibers on a second side of the optical switch and collimating input and output light; and
    a switching element comprising a rod lens and at least one mirror, the rod lens and the mirrors being moveable between a first position, wherein the rod lens aligns with the first and second collimators, and a second position, wherein the mirrors align with the first and second collimators;
    whereby, when the switching element is in the first position, light from the input fibers transmits through the rod lens to the output fibers on an opposite side of the optical switch, and when the switching element is in the second position, light from the input fibers is reflected by the mirrors to output fibers on a same side of the optical switch.

18. The optical switch of claim 17, wherein the first collimator comprises a first GRIN lens.

19. The optical switch as claimed in claim 18, wherein the first GRIN lens collimates light from input fibers on the first side of the optical switch and light reflected by a first mirror and transmitted by the rod lens.

20. The optical switch of claim 17, wherein the second collimator comprises a second GRIN lens.

21. The optical switch as claimed in claim 20, wherein the second GRIN lens collimates light transmitted by the rod lens, light from input fibers on the second side of the optical switch, and light reflected by a second mirror.

22. The optical switch of claim 17, further comprising a first dual fiber pigtail (DFP), which retains the input and output fibers on the first side of the optical switch.

23. The optical switch of claim 22, further comprising a second DFP, which retains the input and output fibers on the second side of the optical switch.

24. The optical switch of claim 17, further comprising a driver which drives the switching element to move between the first position and the second position.

25. An optical switch assembly comprising:
- a first collimator aligned with a first input fiber a first output fiber for collimating input an output lights, said first collimator including a first quarter pitch GRIN lens;
- a second collimator aligned with a second output fiber for collimating another output light, said second collimator including a second quarter pitch GRIN lens;
- the first collimator and the second collimator commonly defining a longitudinal direction along which light transmits;
- a distance between said first collimator and said second collimator being slightly larger than one half pitch; and
- a switch element laterally moveable between said first collimator and said second collimator perpendicular to said longitudinal direction, said switch element including a penetrating device and a reflection device mutually exclusively positioned between said first collimator and said second collimator, said penetrating device including a half pitch rod lens, said reflection device including at least one mirror element facing the first collimator with a tiny gap when said reflection device is positioned between the first collimator and the second collimator; wherein
  when the reflection device is positioned between the first collimator and the second collimator, the light from the first input fiber leaves via the first output fiber; in contrast, when the penetrating device is positioned between the first collimator and the second collimator, the light from the first input fiber leaves via the second output fiber.

26. The assembly as claimed in claim 25, wherein said second collimator further collimates a second input fiber, and the reflection device further includes a second mirror facing the second collimator with tiny gap when said reflection device is positioned between the first collimator and the second collimator, and wherein when the penetrating device is positioned between the first collimator and the second collimator, light from the second input fiber leaves via the first output fiber, and when the reflection device is positioned between the first collimator and the second collimator, light from the second input fiber leaves via the second output fiber.

* * * * *